May 18, 1926.

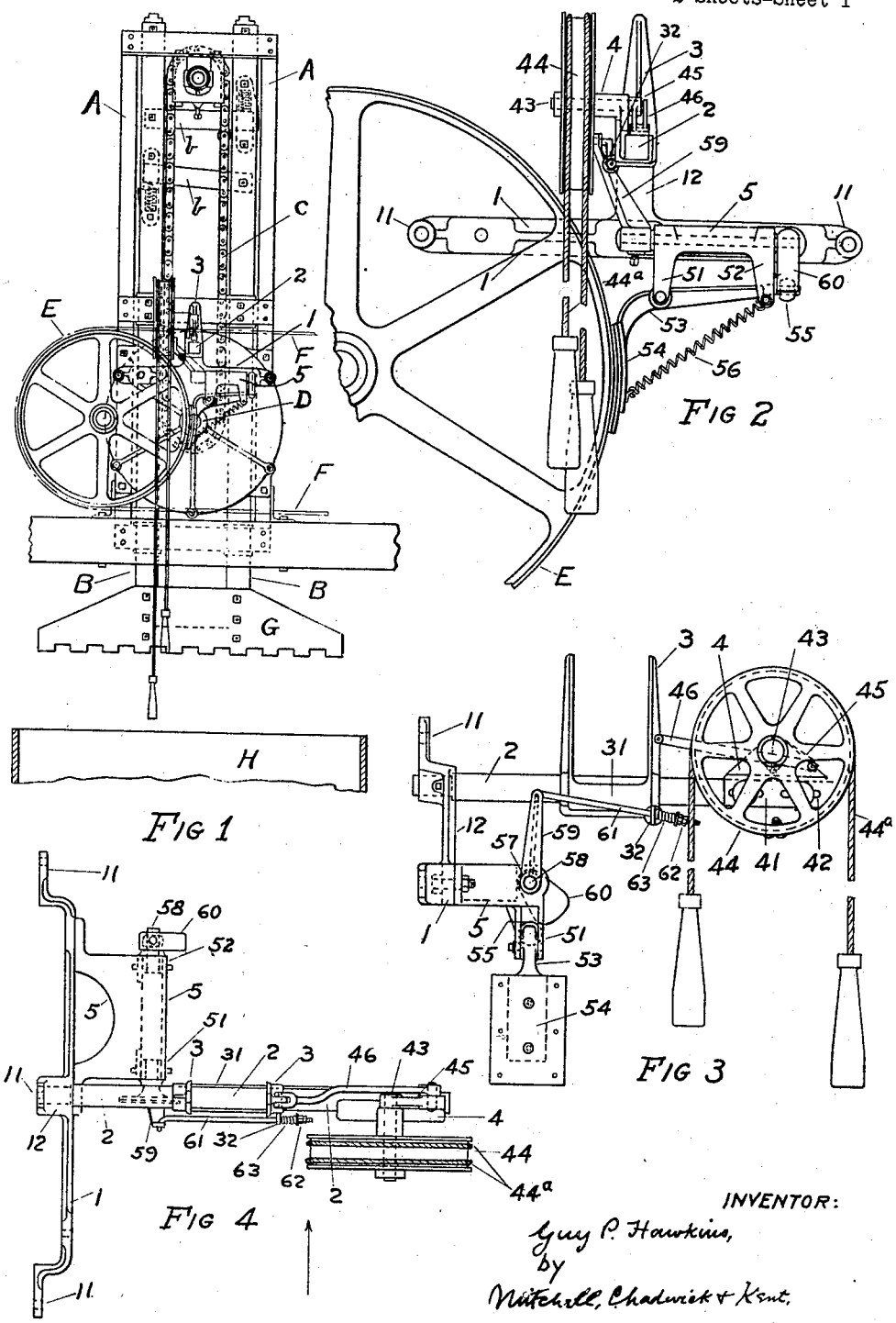

G. P. HAWKINS 1,585,385

AUTOMATIC LOCK AND RELEASE BELT SHIFTER AND BRAKE

Filed June 9, 1925     2 Sheets-Sheet 2

INVENTOR:
Guy P. Hawkins,
by
Mitchell, Chadwick & Kent,
ATTORNEYS.

Patented May 18, 1926.

1,585,385

UNITED STATES PATENT OFFICE.

GUY P. HAWKINS, OF DALLAS, TEXAS, ASSIGNOR TO THE MURRAY COMPANY, OF DALLAS, TEXAS, A CORPORATION OF TEXAS.

AUTOMATIC LOCK AND RELEASE BELT SHIFTER AND BRAKE.

Application filed June 9, 1925. Serial No. 35,899.

My invention is an automatic-lock and automatic-release belt shifter and brake, applicable to any machine which it is desired to hold in position when the driving belt is on the loose pulley and the machine temporarily idle as well as machines in which it is merely desired to positively hold the belt in the fast or loose position and automatically release and relock the shifting mechanism when the belt is moved from fast to loose pulley or from loose to fast pulley.

In the drawings:

Figure 1 is a side view of a cotton tramper, showing my invention as applied thereto;

Figure 2 is an end view of my device;

Figure 3 is a side view;

Figure 4 is a plan view;

Figure 5:
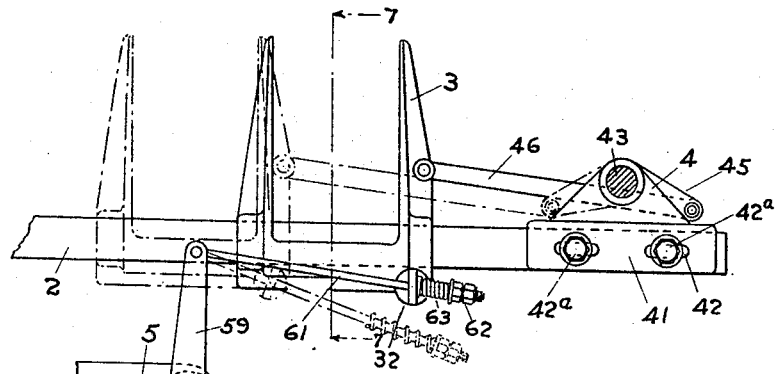
Figure 5 is a view, on an enlarged scale, of the mechanism of Fig. 3, the crank wheel being removed and the moving parts being shown in two positions, in full and in dotted lines.

I have shown my invention as applied to a belt driven tramper for cotton press, such as is fully described and shown in United States Letters Patent, No. 1,463,186, dated July 31, 1923. A tramper is a mechanism arranged above the press box of a cotton press, which as the loose cotton is put into the box pushes a head or follower into the box to press the loose cotton down and expel the air from the interstices of the cotton and is then withdrawn while a new charge is put in, and this is repeated until the box is full of cotton and ready for the application of baling pressure. When this happens the tramper is stopped by shifting the driving belt to the loose pulley with the tramper head or follower elevated, and held in this elevated position in some way, usually by a hand applied brake, applied to the fast pulley, until an empty bale box is again beneath the tramper to be tramped and filled.

In Fig. 1, A is the frame of the tramper, $b$, $b$, the cross-bars secured to the tramper uprights B and extending between a pair of chains C which move between the gear shaft D driven by the pulley E on the driving shaft, which is actuated by the belt F. The tramper head or follower is marked G, and the bale box H.

It is obvious that, as applied to a cotton tramper, the machine requires to be stopped by shifting the driving belt to the loose pulley when the tramper head is withdrawn and out of the bale box at the upper end of its stroke in order that the baling operation may be performed and that it is necessary to brake the fast pulley, when the belt is shifted to the loose pulley to prevent the tramper head from descending by gravity to the bale box and interfering with the baling operation. It will be obvious also that the brake cannot be applied until the belt has been substantially shifted from the fast pulley and that the brake must be removed before the belt is shifted again to the fast pulley.

My invention is concerned with the belt shifting means and the brake applying and releasing means, and consists in providing a shifting means which automatically locks at the fast and loose pulley positions and automatically unlocks when the shifter is to be actuated in either direction and in the organization with the belt shifter of a brake which is delayed in application to the fast pulley until the belt has almost been shifted off the fast pulley and which is removed from the fast pulley as soon as the belt has begun to pass upon the fast pulley in starting the machine. It will be obvious to those familiar with the art that in the operation of a tramper the driving means are subjected to especial strains due to the nature of the machine, which alternately must lift the plunger or follower of the tramper and then retard and support the follower during its descent and then press it into the press box and lift it again to the top of its stroke. The belt therefore if at all imperfect in its application has unusual tendencies to lateral motion, due to the reversal of strains owing to the reversal of forces.

Figure 7:
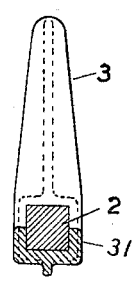
Figure 7 is a section through the slide bar and shifter fork base, on line 7—7 of Fig. 5.
Figure 6:
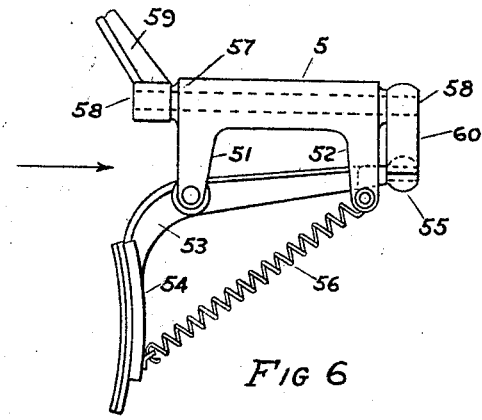
Figure 6 is a detail on an enlarged scale of the brake element.

*Shifter mechanism.*—Referring to the drawings, in Figure 4 is shown a top or plan view of my mechanism, 1 indicating a support or bracket adapted to be secured upon an adjacent part of the machine to which my mechanism is to be applied. The support 1 is provided with suitable bolt holes 11 through which may be passed the connecting bolts by means of which my mechanism is secured in place upon the machine to which it is to be applied. At about mid-length of the support 1 a vertical member 12 rises perpendicular to the support 1 and to this is secured, perpendicular thereto and projecting horizontally therefrom, the shifter slide bar 2, which is preferably angular in cross-section, upon which is mounted all the shifter mechanism. The shifter mechanism consists of a shifter fork 3 having a base or slide 31 which embraces the square slide bar (see Fig. 7) so that the fork is movable longitudinally of the slide bar from one position to its other position, but cannot turn transversely upon the slide bar. Upon the side of the outer or free end of the slide bar is secured a bearing 4 mounted upon a base 41 which is slotted at 42 to permit the bearing to be adjusted within limits along the slide bar and then secured by a bolt and nut connection, the bolt 42ª passing through apertures in the slide bar. The upper end of the bearing 4 carries a short shaft 43 upon one end of which is secured a rope or crank wheel 44 or other actuating means, such as a lever, hand wheel, or the like, and at the opposite end a crank arm 45, the outer end of which is connected, by the crank link 46, with one of the fork members of the shifter fork 3 (see Fig. 5). Upon the flanged wheel 44 are secured ropes 44ª which pass about the wheel in opposite directions (see Fig. 3) and are secured to the wheel at their ends. It will be obvious that when one of these ropes is pulled the rope will be unwound and the wheel 44 and shaft 43 will be turned and the other rope wound onto the wheel 44 and when the other rope is pulled the process will be reversed. The crank arm 45 is carried above the base 41 of the bearing and as the wheel and shaft turn is thrown from one side of the shaft 43 to the other until the crank arm contacts with the base 41, which acts as a stop, at the end of a little more than one half a revolution of the crank arm. The effect is that the crank at either end of its movement is a little below the longitudinal axis of shaft 43 so that the shifter fork 3 cannot move until the shaft 43 is rotated. It will now be clear that rotation of the rope-wheel 44 in either direction will cause the fork 3 through link 46, to be moved along the shifter bar 2 from one end of its throw to the other until the crank arm 45 has passed the dead center and contacted with the base 41 of the bearing 4, a position which prevents the fork 3 from moving in either direction until the crank is reversed by means of the actuating wheel 44, whereupon the dead center is eliminated by the initial movement of the wheel 44 and the fork 5 shifted to the other extreme of its throw, where it is in like manner locked.

*Brake mechanism.*—The brake mechanism is preferably carried by a supplementary support or bracket 5 secured at one end of the main support 1 (see Fig. 4). It is shown in plan in Fig. 4, in side or end view in Fig. 3 (looking in the direction of the arrow in Fig. 4) and in front view in Fig. 2. As is shown in Figs. 3 and 4, the bracket 5 has at its outer edge depending pairs of lugs 51 and 52. Lugs 51 have pivoted thereto a bell-crank 53, one arm of which carries a brake element 54 and the other an anti-friction roller 55 whose operative face is curved in the arc of a circle. Lug 52 has secured thereto one end of a tension spring 56 the other end of which is secured to the brake element 54 and tends constantly to retract the brake element. At the outer edge of bracket 5, above the lugs 51 and 52, are bearings 57 carrying a shaft 58 to one end of which is secured a lever 59 and to the other a cam 60 above the anti-friction roller 55. The upper end of lever 59 is slightly off-set (see Fig. 2) and carries a rod 61 (see Figs. 3 and 4) which passes through an eye stud 32 on shifter fork 3, the eye-stud being secured to the base of the shifter fork, with capacity for slight rotation (see Fig. 5). The free end of the rod 61 carries threads and a nut 62 and between the nut and the eye-stud a compression spring 63 which is of relatively stiff wire, but short and of few coils. In Figs. 3 and 4 the shifter fork is shown in the loose-pulley position, the spring 63 compressed and the cam 60 pressing the roller 55 down and the brake 54 into action, against the effort of tension spring 56 which is of relatively light wire and of many coils. As soon as the shifting fork 3 begins to move toward the fast pulley position the compression spring 63 is eased and being short is almost immediately extended permitting the tension spring 56 to retract the brake and lift the bell crank arm and roller 55, turning the cam 60 slightly, the cam never being on dead-center. After the brake is thus retracted the shifter-fork 3 completes its movement, leaving rod 61 and spring 63 as shown in Fig. 5 in dotted lines. Upon the reverse movement, to shift the belt from fast to loose pulley, the brake remains retracted until the movement of the shifting fork 3 brings the eye-stud 32 into contact with the compression spring 63. Further movement toward the end of the stroke of shifter fork 3, compresses the spring 63, and, through the rod 61 and lever 59, turns the cam 60 to shift the bell crank lever and advance the brake 54 against the effort of tension spring 56. It will be apparent therefore that the brake is not applied until the belt is about to completely leave the fast pulley for the loose pulley and that the brake is retracted as soon as the belt begins to pass upon the fast pulley from the loose pulley. The brake pressure is controlled by the stiffness of the compression spring and its reaction in the final position of the shifter fork carrying the belt onto the loose pulley and the time of application of and of release of the brake may be varied or adjusted by varying the longitudinal position of spring 63 upon the rod 61 by means of the nut 62, so that the eye-stud 32 begins to compress spring 63 earlier or later.

I claim:

1. In a belt shifter, a shifter slide bar supported adjacent a machine and parallel to the face of the machine belt pulleys; a shifter fork mounted upon and movable to and fro along the shifter bar between extreme positions respectively opposite the fast and loose pulleys; a bearing at one end of the shifter bar; a crank supported by said bearing; a stop in the path of the crank to permit a partial and prevent complete revolution of the crank; a link connecting crank and shifter fork; actuating means to throw the crank and carry the link beyond the dead center to shift and lock the shifter fork until the crank is actuated in reverse to unlock, shift and relock the shifter fork.

2. In a belt-shifter, a shifter slide bar supported adjacent a machine and parallel to the face of the machine belt pulleys; a shifter fork, mounted upon and removeable to and fro along the shifter slide bar between extreme positions respectively opposite the fast and loose pulleys; locking means to secure the fork in either position upon the shifter slide bar; actuating means to successively release the lock, shift the fork and lock it again in position; a brake element supported in operative relation to the fast pulley; linkage between the brake and a moving part of the shifter mechanism to cause the brake to engage the fast pulley as the belt is shifted to the loose pulley and to retract the brake as the belt is shifted to the fast pulley.

3. As in claim 1, and a brake element, supported in operative relation to the fast pulley; linkage between the brake and the shifter fork to cause the brake to engage the fast pulley as the belt is shifted to the loose pulley and to retract the brake as the belt is shifted to the fast pulley.

4. In a belt shifter and automatic brake, a shifter fork supported for reciprocation adjacent and parallel to the face of the belt pulleys; a brake supported in operative relation to the fast pulley; an eye-stud upon the shifter-fork, linkage between the brake and the shifter fork, including a rod passing through the eye-stud; an abutment at the free end of the rod; a compression spring between the abutment and the eye-stud; a tension spring tending to retract the brake, all organized, substantially as described to cause movement of the shifter fork to the loose pulley position to compress the compression spring and set the brake and reverse motion to release the compression spring and suffer the brake to be retracted.

5. In a belt shifter and automatic brake, a shifter fork supported for reciprocation adjacent and parallel to the face of the belt pulleys; an eye-stud upon the shifter fork; a brake supported upon a lever and in operative relation to the fast pulley; a cam in operative relation to the lever; a second lever connected to and actuating the cam; a rod connected at one end to that lever and passing through the eye-stud; an abutment at the free end of the rod; a compression spring between the abutment and the eye-stud; a tension spring tending to retract the brake, all organized, substantially as described to cause movement of the shifter fork to the loose pulley position to compress the compression spring to set the brake against the resistance of the tension spring and reverse motion to release the compression spring and suffer the brake to be retracted.

Signed at Dallas, Texas, this 1st day of June 1925.

GUY P. HAWKINS.